United States Patent [19]
Tardieu

[11] 3,974,247
[45] *Aug. 10, 1976

[54] PROCESS FOR SHAPING COMPONENTS MADE OF CONCRETE OR MORTAR

[75] Inventor: André Tardieu, La Couronne, France

[73] Assignee: Societe Anonyme Coignet, Paris, France

[*] Notice: The portion of the term of this patent subsequent to May 28, 1991, has been disclaimed.

[22] Filed: July 23, 1973

[21] Appl. No.: 381,570

[30] Foreign Application Priority Data
July 26, 1972 France............................. 72-27197
Aug. 17, 1972 France............................. 72-29762

[52] U.S. Cl.............................. 264/28; 264/228; 264/336

[51] Int. Cl.² ........................................... B28B 1/00
[58] Field of Search ............... 264/28, 228, 336, 333

[56] References Cited
UNITED STATES PATENTS

| | | | |
|---|---|---|---|
| 870,370 | 11/1907 | Lamson | 264/28 |
| 2,793,963 | 5/1957 | Tym | 264/28 X |
| 3,813,460 | 5/1974 | Tardieu | 264/28 |

Primary Examiner—Robert F. White
Assistant Examiner—Thomas P. Pavelko
Attorney, Agent, or Firm—Spencer & Kaye

[57] ABSTRACT

Process and device for shaping components made of mortar or concrete in which the temperature of the concrete is reduced to a value which makes it possible to freeze concretes and mortars.

6 Claims, 9 Drawing Figures

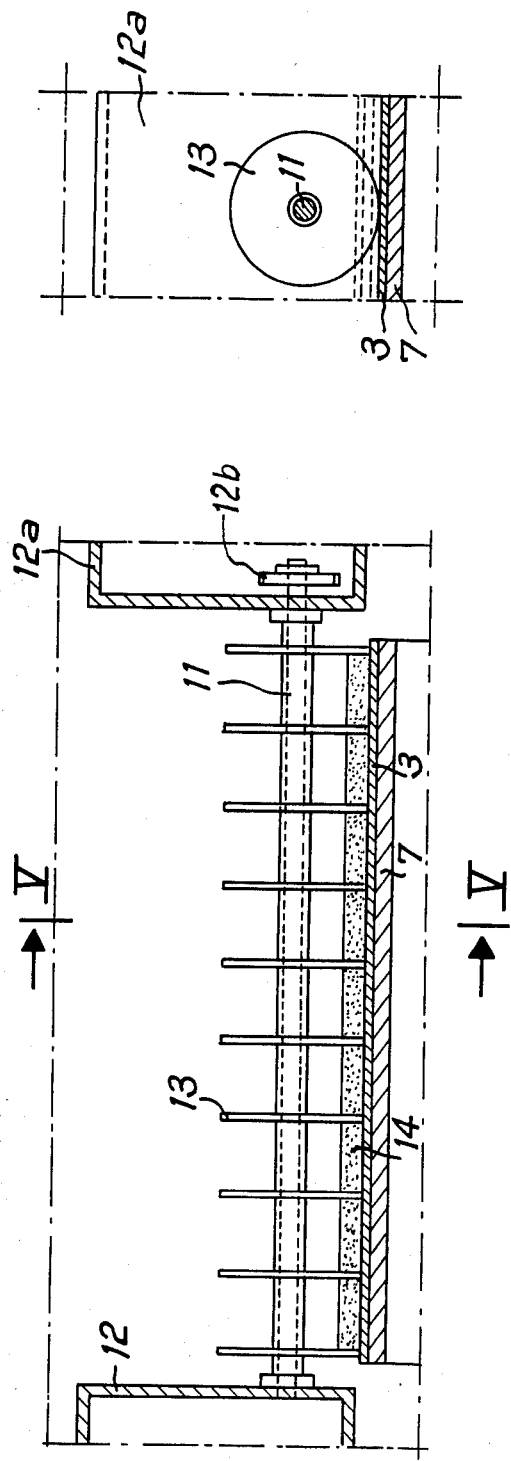

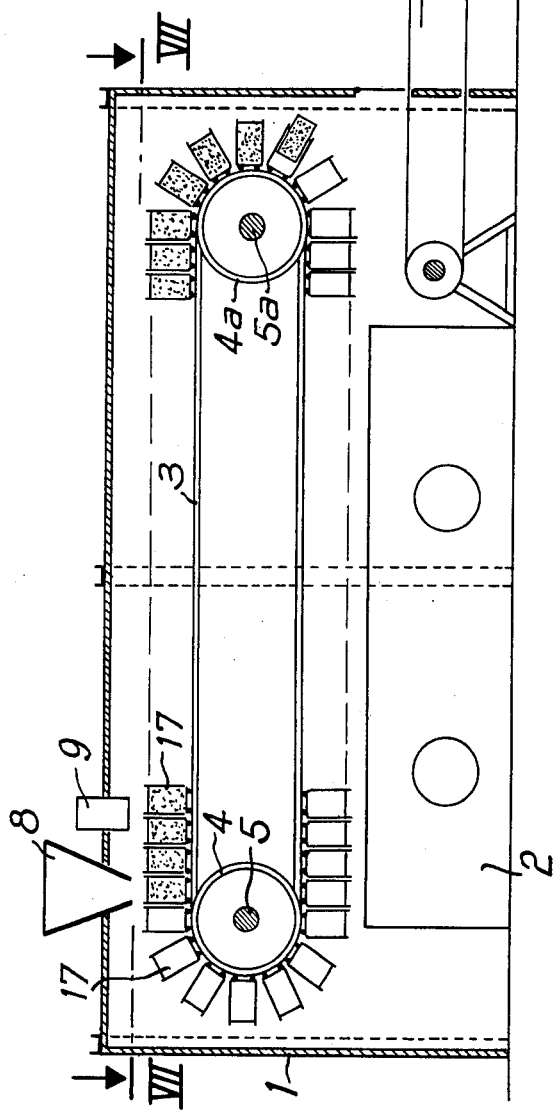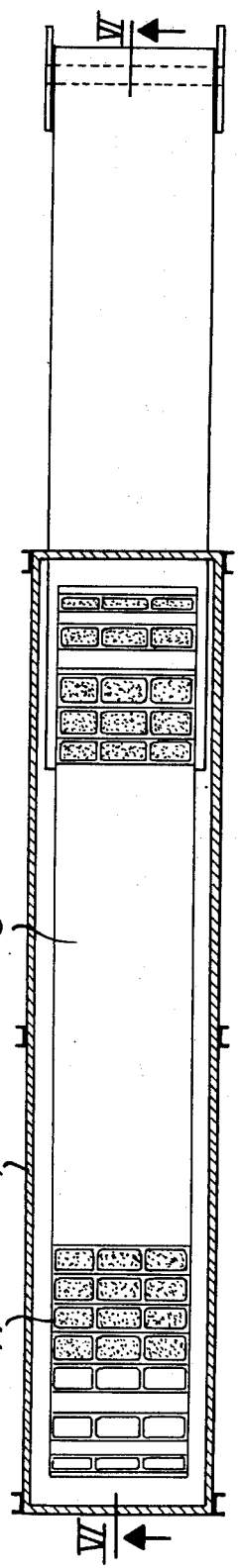

PROCESS FOR SHAPING COMPONENTS MADE OF CONCRETE OR MORTAR

The present invention relates to a process and device for shaping elements made of concrete or mortar.

Elements made of concrete or mortar such as girders, posts, panels and the like, are obtained after casting and drying in moulds. These moulds used to be held stationary during the setting period and during the early part of the curing period, that is to say for about twelve hours. With tiles, tubes, agglomerates or pipes, release from the moulds can take place immediately, but handling or transport must be particularly gentle during the entire dyring period.

According to one aspect of the present invention there is provided a process for shaping elements of mortar or concrete, comprising simultaneously shaping and freezing the mortar or concrete and subsequently unfreezing, setting and curing the said elements obtained.

Freezing can be achieved by contact, by means of air or a refrigerant gas, no matter what type of aggregates are used. In order not to change their mechanical strengths, the concretes or mortars must be frozen at the start of setting.

The process according to the invention makes it possible to facilitate the handling of the components when they are removed from the moulds, to gain a large amount of space in the drying areas and to facilitate release from the moulds dues to the film of ice which forms between the mould and the mortar or concrete.

The concrete obtained in a frozen form on being removed from the moulds has a high strength and can be handled in the necessary manner for conveying it and manipulating it inside the drying building; these handling processes may be carried out until the start of unfreezing, and at least for 1 hour. In order that the moulded components or parts retain their original shape, it is recommended to prevent them from touching one another.

With the process of this invention, the moulds need not be immobilised during the drying period of the concrete or mortar. This is particularly valuable in the case of long components such as girders or posts where at the present time, the moulds must remain in the one position for about 12 hours.

The gain in space in the storage areas results from the possibility of handling the shaped elements after release from the moulds so that they can be moved closer to one another or placed at different levels. The components can also be transported on moving belts without special precautions.

The step of greasing the moulds can be dispensed with and replaced by a washing process. In certain cases such conventional greasing has has a detrimental effect on the anchoring capacity of the component produced by manufacture in a greased or oiled mould.

It is now possible to manufacture posts, girders, tubes, pipes and the like as a continuous length, in the same way as with systems using dies which are employed especially for manufacturing bricks or tubes. These moulded and frozen parts can then be cut up into the required lengths.

It is also possible to equip the moulded parts or components with a reinforcement in order to produce parts or components made of reinforced concrete. The prefabricated components may be subjected to a post-stressing operation.

According to a further aspect of the invention there is provided a device for the continuous manufacture of elements or products of concrete or mortar, comprising a chamber in which the temperature is kept at a value at or below the freezing point of concrete or mortar, an endless member in the chamber, means for driving the member for continuous circulation in the chamber, a hopper for pouring concrete or mortar onto the belt, and a vibrating rod downstream of the hopper adjustable in height relative to the endless member.

This concrete is vibrated, is then frozen and is thereafter taken away again or released from the mould when it is in the solid state.

In order that the present invention may more readily be understood, the following description is given by way of example, reference being made to the accompanying drawings in which:

FIG. 4 is an elevational view of a device for cutting up the concrete or mortar;

FIG. 5 is a cross-sectional view along the line V—V of FIG. 4;

FIG. 6 is a cross-sectional view in elevation of another embodiment of the moulding device along the line VI—VI of FIG. 7;

FIG. 7 is cross-sectional view along the line VII—VII of FIG. 6;

Figure 3:
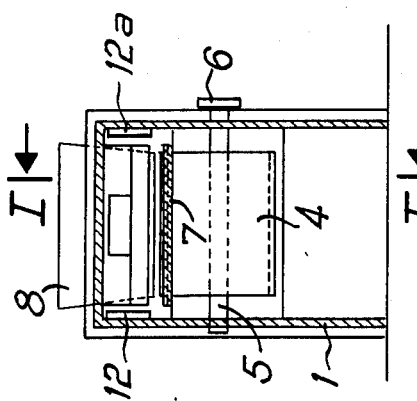
FIG. 3 is a transverse cross-sectional view taken along the line III—III of FIG. 1.
Figure 1:
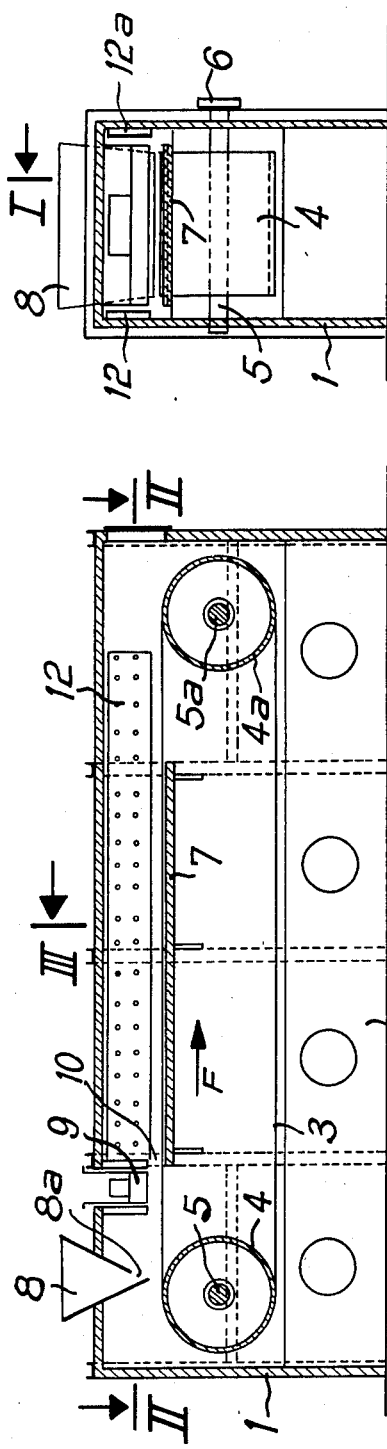
FIG. 1 is a longitudinal cross-sectional view of an embodiment of the shaping device taken along the line I—I of FIG. 3.
Figure 2:
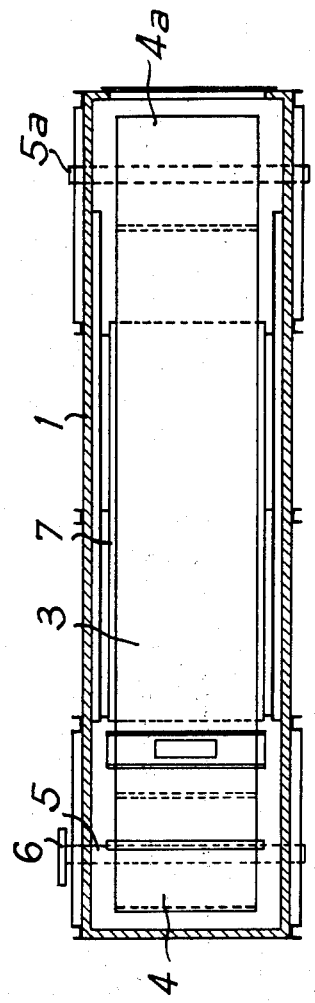
FIG. 2 is a longitudinal cross-sectional view of the device taken along the line II—II of FIG. 1.

The device represented in FIGS. 1, 2 and 3 comprises a chamber 1 having in its lower portion a refrigeration unit 2 of known type which makes it possible to lower the temperature in the chamber 1 in order to cause the concrete or mortar to freeze.

An endless belt 3, capable of moving continuously in the direction of the arrow F, is mounted inside the chamber 1 on two rollers 4 and 4a carried by axles 5 and 5a mounted to rotate on the frame of the chamber 1. One of the axles here the axle 5 carries a drive wheel 6 rotated by a drive device not shown in the drawing. The upper run of the endless belt 3 is supported by a plate 7 attached to the frame.

Above one end of the upper run of the endless belt 3 is a feed hopper 8 having an outlet orifice 8a through which the concrete or mortar flows onto the endless belt 3. Downstream of the hopper is a vibrating rod 9, the level of which can be adjusted, the rod 9 enabling the thickness of the layer 10 of concrete or mortar present on the belt 3 to be adjusted.

The concrete or mortar, which is in the paste-like state in the hopper 8 and has preferably been mixed less than one hour earlier, spreads over the upper run of the belt 3 which is driven continuously in the direction of the arrow F. The concrete or mortar is carried under the vibrating rod 9 which evens out the layer 10, adjusts its thickness and subjects it to a vibrating action. As it travels on the endless belt, the layer of concrete or mortar 10 is subjected to the cooling effect produced by the refrigeration unit 2. Under the effect of the cold air, the concrete solidifies to detach itself from the upper run of the belt 3 at its end opposite the hopper, from where it is taken up again by a conveyor of a known type, especially one having an endless belt.

The concrete or mortar, in the solid state after freezing, can be in the form of discrete solid or perforated plates of a continuous web whose width and thickness can be varied.

FIGS. 4 and 5 represent a device for cutting up the layer 10 of concrete or mortar carried on the belt 3. This device comprises a shaft 11 carried by U-shaped profiles 12 and 12a attached to the wall of the chamber 1, and the shaft 11, which is rotated from a pulley 12b by a drive device, carries discs 13 distributed along the entire length of the shaft 11 at predetermined intervals.

This arrangement makes it possible to cut up the layer of concrete or mortar 10 longitudinally into parallel strips 14 by means of the discs 13 which cut the concrete when it starts to solidify.

In order to produce profiled components of different shapes such as profiled parts in the shape of a U, in the shape of a T, or in the shape of a semi-circle, it is possible to provide a belt having the desired profile or imprint.

Movement or handling operations must stop as soon as the unfreezing process begins. A concrete which has been frozen to −15°C can subsequently be handled safely for about 1 hour at an ambient temperature of +18°C. After this period of time or at a higher working temperature, there is a risk of producing deformations on handling. However, these handling periods can be lengthened by lowering the handling temperature.

The concrete travelling on the endless belt can, if desired, be made to pass between shaping means to give it the desired profile. This operation must be carried out at the start of solidification of the concrete or mortar whether or not it is reinforced.

Figure 9:
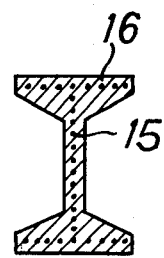
FIG. 9 is a cross-sectional view of a shaped element made of reinforced concrete.

It has been found that the presence of metal reinforcements in the concrete or mortar assists it to keep its shape during unfreezing. By way of example, an I section beam 16 which is 40cm long and 15cm high and has flanges of which measure 4cm thick and a web 2cm thick, became unfrozen and dried in the atmosphere without deformation due to a small metal reinforcement consisting of longitudinal wires 15 of diameter 1mm (FIG. 9).

If desired, the elements may be subjected to a post stressing operation.

Furthermore, it has been found that, at the time of unfreezing, the concrete or mortar gives off water which is free from traces of cement.

Figure 8:
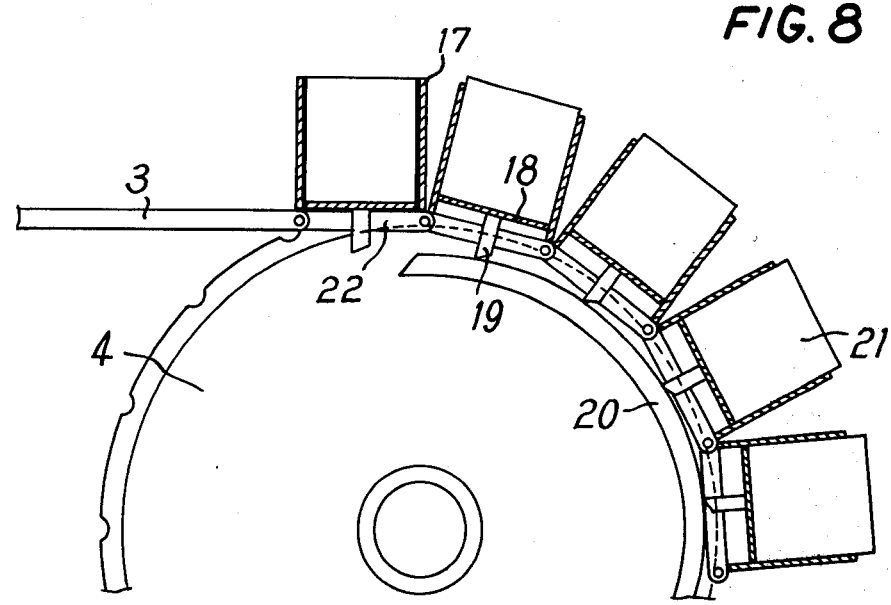
FIG. 8 shows a detail of FIG. 6 illustrating the mould release device.

FIGS. 6, 7 and 8 represent another embodiment of a device for shaping elements of concrete or mortar, in which moulds 17 of the type used especially for agglomerates or tiles are attached to the endless belt 3.

The concrete or mortar flows from the hopper 8 into the moulds 17 where it is vibrated thereafter by means of impact with the levelling rod 9. During the movement of the endless belt 3 the concrete or mortar is being frozen. The release of the frozen elements from the moulds is carried out at the belt support roller opposite to the hopper 8.

As represented in FIG. 8, the moulds 17 are each provided with a movable base 18 carrying a finger 19 which cooperates with a fixed arcuate cam 20 so that the fingers 19 are pushed gradually back by the cam 20 in such a way that as the mould moves around the support roller, the movable base 18 rises along the walls of the mould to eject the moulded component 21 from the mould.

Although a device in which the moulds are attached to an endless belt has been represented in FIGS. 6 and 7, it is possible to drive the moulds by means of chains 22, as represented in FIG. 8.

In an alternative embodiment, suitable moulds, filled with concrete or mortar, are immersed in a refrigerated liquid. In a further embodiment, an external jacket consisting of a certain thickness of frozen concrete can be used for holding therewithin unfrozen concrete or mortar without using shuttering. If desired the elements may be formed by simultaneous freezing and extrusion.

The freezing may conveniently be achieved by immersing a filled mould in a refrigerated liquid to freeze the concrete or mortar in the mould.

It is of course possible to provide elements of different shapes merely by using different types of moulds, simultaneously if desired.

I claim:

1. A method of fabricating mortar or concrete elements of predetermined shape, comprising
   at least partly filling molding means of complementary predetermined shape with a water containing mortar or concrete forming mixture,
   freezing the mixture, prior to setting, in the mold until the mixture attains an intermediate solid phase,
   removing the frozen mixture of predetermined shape from the molding means, and
   placing said frozen mixture of predetermined shape in an ambient atmosphere, and letting it harden through combined phases of thawing and setting.

2. A method according to claim 1, wherein the mixture is frozen by the start of setting.

3. A method according to claim 1, further comprising arranging reinforcement members in the molding means before introducing the mixture. k 4. A method according to claim 3, further comprising post-stressing said reinforcement members during the hardening of the mixture.

5. A method according to claim 1, wherein the step of freezing the mixture comprises immersing said mixture into a bath of refrigerant.

6. A method according to claim 1, wherein a film of ice is formed around the frozen mixture, facilitating the release thereof from said molding means.

* * * * *